United States Patent Office 3,695,923
Patented Oct. 3, 1972

3,695,923
COMPOSITE SHEET
Donald F. Thompson, Elburn, and George D. Quartermus, Woodridge, Ill., assignors to Standard Oil Company, Chicago, Ill.
No Drawing. Filed Oct. 30, 1970, Ser. No. 85,755
Int. Cl. B32b 27/32, 27/36
U.S. Cl. 117—76 F                                10 Claims

ABSTRACT OF THE DISCLOSURE

An oriented thermoplastic base sheet having:
(I) a primer coating on at least one side thereof comprising:
  (A) from 50 to 80 parts by weight of an interpolymer comprising from 45 to 60 weight percent of a $C_1$–$C_4$ alkyl methacrylate, from 50 to 35 weight percent of a $C_1$–$C_4$ alkyl acrylate, and from 1 to 5 weight percent of methacrylic, acrylic, or itaconic acid; and
  (B) from 50 to 20 parts by weight of either (1) an adduct of rosin and an alpha-beta unsaturated dicarboxylic acid having an acid number between about 115 and about 140 and a melting point between about 110° C. and about 180° C.; (2) partial esters of said adduct and a polyhydric alcohol; or (3) combinations of said adduct and said partial esters; and
  (C) either 0.5% to 15% (by weight of (B)) of paraffin wax, microcrystalline wax or a mixture of carnauba wax and stearic acid wherein the weight ratio of wax to acid is from 82:18 to 89:11; and
(II) a moisture-vapor and gas barrier coating providing heat-sealing properties applied to said primer comprising 100 parts vinylidene chloride polymer (including copolymers), between about 2% and about 3% clay, and between about 2% and about 3% of either (1) paraffin wax, (2) carnauba wax, or (3) microcrystalline hydrocarbon wax (clay and wax percentages based on vinylidene chloride polymer weight).

BACKGROUND OF THE INVENTION

Various thermoplastic base sheets require the addition of a coating to give them the necessary properties for a satisfactory packaging material. For example, when efforts are made to heat seal oriented polypropylene or polyethylene terephthalate sheets excessive shrinking at the joints provides an unsightly seal. Heat sealing of such sheets requires excessive temperatures not obtainable in conventional packaging equipment. Other sheets such as regenerated cellulose or hydroxyethyl cellulose ether cannot be heat sealed without a coating.

In addition to heat seal requirements thermoplastic base sheets must have other desirable properties to be a useful packaging material. One of the most important properties is the barrier properties of such sheets. Many thermoplastic base sheets would be acceptable as packaging materials except for the fact that they are not good barriers to oxygen or water vapor. Such sheets can be coated, however, with materials which will cause them to be barrier to oxygen and water vapor. Particularly, polymers of vinylidene chloride, copolymers of vinylidene chloride-vinyl chloride, or copolymers of vinylidene chloride-acrylonitrile, all of which are referred to as Saran, may be used to enhance the barrier properties of thermoplastic base sheets.

In the past, attempts at coating a Saran directly onto a polymer shheet have met with little success. As a result many base sheet primers have been developed which serve as an adhesive to secure the base sheet to the Saran overlay. The invention of this disclosure is a thermoplastic base sheet in which a novel primer is used to secure a novel water base Saran overlay thereto. The invention of this disclosure is a composite sheet in which the desirable physical properties have been optimized while the costs of production have been minimized.

SUMMARY OF THE INVENTION

A composite sheet comprising an oriented thermoplastic base sheet and:

(I) a primer coating on at least one side thereof comprising a composition of:
  (A) from 50 to 80 parts by weight of a first component, said first component comprising an interpolymer of from 45 to 60 weight percent of a $C_1$–$C_4$ alkyl methacrylate, from 50 to 35 weight percent of a $C_1$–$C_4$ alkyl acrylate, and from 1 to 5 weight percent of methacrylic, acrylic, or itaconic acid; and
  (B) from 50 to 20 parts by weight of a second component, said second component comprising a compound selected from the group consisting of (1) an adduct of rosin and an alpha-beta unsaturated dicarboxylic acid, said adduct having an acid number between about 115 and about 140 and a melting point between about 110° C. and about 180° C.; (2) partial esters of said adduct and a polyhydric alcohol; and (3) combinations of said adduct and said partial esters; the total parts by weight of said first component and said second component equalling 100; and
  (C) a wax containing component selected from the group consisting of paraffin wax, microcrystalline hydrocarbon wax and a mixture of carnauba wax and stearic acid wherein the weight ratio of wax to acid is from 82:18 to 89:11, the wax containing component being present in an amount in the range of between about ½% and about 15% based upon the combined weight of the interpolymer combined with either the adduct, the partial esters or the combination of the adduct and the partial esters; and
(II) a moisture vapor and gas barrier second coating applied to said primer coating, said second coating comprising a composition of 100 parts of a polymer selected from the group consisting of polyvinylidene chloride, copolymers of vinylidene chloride and acrylonitrile and copolymers of vinylidene chloride and vinyl chloride, between about 2% and about 3% clay based on the weight of such polymer and between about 2% and about 3% wax, also based upon the weight of such polymer, the wax being selected from the group consisting of paraffin wax, carnauba wax and microcrystalline hydrocarbon wax.

This composite sheet has excellent heat seal properties as well as excellent barrier properties, yet since it is made from a water base primer and Saran overlay it is inexpensive to produce.

PREFERRED EMBODIMENTS

Components

The base sheet of this invention is a monoaxially or biaxially oriented thermoplastic resin sheet such as, but not limited to polypropylene, polyethylene, polethylene terephthalate, polycarbonate and the like. The surface of the base sheet is advantageously pretreated to improve adhesion between the primer and the base sheet. Treatments of the base sheet surface include acid or oxidizing treatments and electrical discharge treatment.

Primer components

The acrylic interpolymer of this invention is from 50 to 60 weight percent of a $C_1$–$C_4$ alkyl methacrylate, from 50 to 40 weight percent of a $C_1$–$C_4$ alkyl acrylate and from 1 to 5 weight percent of an acid selected from the group consisting of methacrylic, acrylic and itaconic said, the total weight percent of interpolymer not exceeding 100. The preferred $C_1$–$C_4$ alkyl methacrylate is methyl methacrylate. The preferred $C_1$–$C_4$ alkyl acrylate is ethyl acrylate and the preferred acid is methacrylic acid.

The preferred rosin is ordinarily wood rosin or gum rosin, but may include equivalent materials, for example, abietic acid, crystalline abietic acid, isomerized rosin and polymerized rosin.

The alpha-beta unsaturated dicarboxylic acid suitable for use in the invention of this disclosure includes but is not limited to such acids as fumaric acid, maleic anhydride, citraconic acid, citraconic anhydride and mesaconic acid.

The preferred partial esters of the adducts of rosin and an alpha-beta unsaturated dicarboxylic acid are formed with polyhydric alcohols which include, for example, ethylene glycol, propylene glycol, butyl glycol, diethylene glycol, triethylene glycol, tetraethylene glycol, glycerol, diglyceryl ether, pentaerythritol, sorbitol and mannitol. Glycerol or mixtures containing active amounts of glycerol are preferred on the basis of availability and cost.

The wax containing component is selected from the group consisting of paraffin wax, microcrystalline hydrocarbon wax, and a mixture of carnauba wax and stearic acid wherein the weight ratio of wax to acid is from 82:18 to 89:11.

The preferred Saran is vinylidene chloride copolymer comprising about 90% vinylidene chloride and 10% by weight of acrylonitrile.

Preparation of primer components

The acrylic interpolymer of this invention is advantageously formed by an emulsion polymerization technique that gives an aqueous product. In general, the techniques of emulsion polymerization in an aqueous system are well known in the art. Generally, such a system contains the monomers to be copolymerized, water, an an initiator and activator, e.g., ammonium persulfate and metasodium bisulfite, and a dispersing agent, e.g., sodium lauryl sulfate. Polymerization is effected by combining all the components with constant stirring. At completion of the polymerization reaction, if a more dilute dispersion is desired additional water may be added.

The adduct of rosin and an alpha-beta unsaturated dicarboxylic acid is readily formed by adding the acid to molten rosin and holding the rosin in the molten state until the adduct is formed. In general, an amount of acid ranging from 10 to 50%, preferably about 25%, based on the weight of the rosin is used. It is important that the rosin adduct have an acid number between about 115 and about 140 and a melting point of between about 110° C. and about 180° C., so that the rosin adduct can be readily dispersed in an aqueous alkaline solution; such dispersion is then compatible with the aqueous dispersion of acrylic interpolymer. The rosin adduct formed is a hard, high melting, modified rosin which, in combination with the acrylic interpolymer of this invention, forms a very desirable coating for the clear, oriented base sheet.

Partial esterification of the rosin-acid adduct may be employed, if necessary, to obtain an acid number between about 115 and about 140. For example, partial esterification may be effected by heating a polyhydric alcohol or mixture of polyhydric alcohols with the rosin-acid adduct at a temperature of about 250° C. in an inert atmosphere. In general, the amount of polyhydric alcohol used is the least amount required to produce a rosin-acid adduct having an acid number between about 115 and about 140. It is to be understood that with some methods of preparation rosin-acid adduct will have an acid number and melting point within the desired range, but in other cases, it may be necessary to further esterify the rosin-acid adduct to lower its acid number to the desired range. The term partial ester as used in the specification and claims refers to the esterified rosin-acid adduct formed when the rosin-acid adduct is combined with polyhydric alcohols.

Both the rosin-acid adduct and the partial ester thereof are dispersed in aqueous medium as follows:

Water is heated to about 100° C. While agitating the hot water about 10 to about 50%, based on the weight of hot water, of finely-powdered rosin-acid adduct or partial ester thereof is added slowly and stirring is continued until a clear solution is formed. Ammonium hydroxide is added to the water in an amount to produce a pH of about 9 after the particular adduct or ester being used is added. The solution is allowed to cool and, if it becomes cloudy ammonium hydroxide is added until it clears.

The wax containing component of the primer coating of this invention is incorporated into the primer coating composition in the form of an emulsion. The wax containing component may be formed as follows: A mixture of carnauba wax, and stearic acid is melted and held at about 100° C. Morpholine is then added, and the mixture is stirred until it appears to be homogenous. Boiling water is then added until a thick water-in-wax emulsion is formed. Addition of water is continued until inversion of the emulsion into a wax-in-water emulsion takes place. Addition of water is then continued until a clear emulsion is formed, after which it is cooled.

Alternatively, the wax emulsion may be formed as follows: Microcrystalline wax, for example, is melted and held at about 100° C. Emulsifying agents, for example, 6.8% of sorbitan monostearate or 8.5% of polyoxyethylene sorbitan monostearate, based on the weight of the wax, are added with constant stirring. When the wax and the emulsifiers are completely homogenous, boiling water is slowly added with agitation until a thick water-in-wax emulsion is formed. The addition of water is continued until inversion of the emulsion to a wax-in-water emulsion occurs. When the inversion occurs water may be added more rapidly. After the desired amount of water is added, the emulsion is immediately cooled in an ice bath with mild agitation. This quenching produces a preferred particle size for the wax. Though wax particles of smaller or larger sizes will be adequate for coating systems used in some applications, the preferred average wax particle size ranges between 0.1 and 0.2 microns. This range is prferred since smaller wax particles tend to become too soluble in the aqueous coating composition and thus will not migrate to the coating surface, thereby causing lower heat-seal strengths and loss of slip characteristics. Larger particles tend to produce a hazy film and higher initial heat seal temperature requirements.

The Saran in the second coating of this invention can be obtained commercially. Suitable Saran aqueous emulsions are available from W. R. Grace & Co. These emulsions are identified as Daran 210, 211 and 212. These aqueous emulsions have the following chemical and physical properties:

numerous methods well known to those skilled in the art. For example, application of the primer coating may be accomplished by using a Gravure Roller to transfer it from a reservoir to the oriented thermoplastic base sheet in a continuous operation. Alternatively, it may be applied by hand by using a brush or similar means.

| | Daran 210 | Daran 211 | Daran 212 |
|---|---|---|---|
| Total solids | 60–62% | 60–62% | 60–62%. |
| pH | 4.0–4.5 | 4.0–4.5 | 4.0–4.5. |
| Color | Cream white | Cream white | Cream white. |
| Freezing point | 36° F | 36° F | 36° F. |
| Particle size | .13 avg. (micron) | .13 avg. (micron) | .13 avg. (micron). |
| Wt./gal | 11.0–11.2 | 10.9–11.1 | 10.8–11.0. |
| Mechanical stability | Excellent | Excellent | Excellent. |
| Storage stability | do | do | Do. |
| Specific gravity | 1.326–1.340 | 1.317–1.330 | 1.309–1.320. |
| Viscosity (Brookfield #1 Spindle, 60 r.p.m.) | 75 cps. max. at 25° C. and 60% T.S. | 75 cps. max. at 25° C. and 60% T.S. | 75 cps. max. at 25° C. and 60% T.S. |
| Heat Sealability (film) | 300° F., 20 p.s.i., ½ sec | 285° F., 20 p.s.i., ½ sec | 275° F., 20 p.s.i., ½ sec. |
| Moisture barrier (½ mil. film)[1] | 0.12–0.15 | 0.20–0.25 | 0.25–0.30. |

[1] Gms./100 sq. in./24 hrs. at 90% RH and 100° F. WVTR.

The wax used in the Saran coating can be prepared in the same manner as described above as an alternative procedure for preparing the wax containing component of the primer. Waxes suitable for use in the Saran are, but not limited to, microcrystalline hydrocarbon wax, paraffin wax, and carnauba wax.

The clay used in the Saran coating is any clay which has a particle size between .01 and 10 microns. Suitable clays are commercially available in water solutions. One such clay is produced by Interchemical Corp. and is designated as Clay P 192 E264.

Preparation of primer and second coating

The preparation of the primer coating is accomplished as follows: Weighed quantities of the rosin-acid adduct and the acrylic interpolymer are mixed, and then the desired quantity of wax containing component is added. Generally from 1 to 5%, based on the weight of rosin-acid adduct and acrylic interpolymer of paraffin wax or microcrystalline hydrocarbon wax is used, and preferably 2 to 3% is used. Alternatively, from 6 to 8%, based on the weight of rosin-acid adduct and acrylic interpolymer, of a mixture of carnauba wax and stearic acid wherein the weight ratio of wax to acid is from 82:18 to 89:11 is used. Additional water is then added to bring the desired solids concentration to a range of from about 5 to about 50 weight percent, depending upon the method of primer coating application to be used and the desired primer coating weight.

The Saran is prepared by diluting the aqueous solution with water to about 35 weight percent solids. The wax emulsion, prepared according to the alternative preparation procedure for the wax containing component of the primer, is added with constant stirring. Generally the wax emulsion is 15% solids. The amount of wax added is between about 2% and about 3% by weight based upon the solids of the aqueous Saran solution. This amount of wax has been found to be critical in that higher amounts destroy the barrier properties of the Saran coated base sheets and make them more difficult to heat seal. Lower amounts of wax do not provide adequete crimp jaw release properties for the Saran coated base sheets. Stirring is continued and clay in water solution is added. The water solution of clay is generally about 50% solids. The amount of clay added is between about 2% and about 3% by weight based upon the weight of solids of the aqueous Saran solution. Stirring is continued until the solution is homogenous. The amount of clay has been found to be critical in that lower amounts do not provide adequate resistance to blocking while greater amounts destroy the barrier properties of the Saran.

Preparation of composite sheet

The primer coating of this disclosure may be applied to an oriented thermoplastic base sheet using any one of numerous methods well known to those skilled in the art. For example, application of the primer coating may be accomplished by using a Gravure Roller to transfer it from a reservoir to the oriented thermoplastic base sheet in a continuous operation. Alternatively, it may be applied by hand by using a brush or similar means.

In the same manner the second coating may then be applied to the primer coating and dried to give a thermoplastic base sheet having modified properties.

EXAMPLE I 173.5 grams of Saran comprising about 90% vinylidene chloride and 10% by weight of acrylonitrile and having 60.5 wt. percent solids was diluted with 120.5 grams of water, while being constantly stirred. Fourteen grams of aqueous carnauba wax emulsion prepared as described above was added also with constant stirring. The carnauba wax emulsion was 15 weight percent solids. 3.96 grams of aqueous clay solution as prepared above were added with constant stirring. The clay solution was 53% solids. Then the emulsion was stirred until it became homogenous. The resulting second coating was 35 wt. percent solids of which 2 wt. percent was clay and 2 wt. percent was wax.

An oriented polypropylene base sheet was then coated on one side only, with the primer coating of this invention by using a Gravure Roller. The thickness of the primer coating was 1–2 mils. The primer coated side of the base sheet was then additionally coated with the aqueous Saran emulsion of this invention. The thickness of the Saran coating was also about 1–2 mils. The resulting composite sheet was cut into strips two inches wide and heat sealed with coated sides in contact with each other. The heat seal temperatures used ranged from 210° F. to 290° F. The strips were tested by pulling the sealed strips at right angles and recording the force required to break the seal. The range of heat seal strengths, reported in grams per two inch strip, for each temperature are reported in Table I. The highest number in the range of heat seal strengths for coated sides sealed to each other (as in the examples) must be at least as follows: for the 290° F. sealing temperature, 400 gms./2″ strip; for the 250° F. sealing temperature, 300 gms./2″ strip; for the 210° F. sealing temperature, 100 gms./2″ strip.

The tendency of the composite sheet to block was determined by winding the coated sheet on a roll and allowing it to sit at room temperature for about 2 weeks. The rolls were then unwound and the tendency to block was estimated and rated on a scale of 0–4 with two or less being acceptable. The results are reported in Table I.

The barrier properties of the composite sheet of this invention were also measured. The measurement was made by placing the composite sheet in a holding apparatus in such a manner that there was a 1 atmosphere oxygen pressure differential across the sheet. The measurement was reported in terms of cc. of $O_2$ passed through the composite sheet per 100 sq. inches of sheet per 24 hours at one atmosphere pressure differential. Coated sheets having an $O_2$ rating of 10 are suitable for general use; coated sheets having an $O_2$ rating of less than one are suitable for special applications as well. The barrier properties are given in Table I below.

EXAMPLE II

A composite sheet was prepared according to the procedure set forth in Example I except that two sides were coated. The same physical tests were run on the two side coated composite sheet. The physical test results are given in Table I below.

EXAMPLE III

A composite sheet was prepared according to the procedure set forth in Example II except the amounts of wax and clay in the aqueous Saran coating were varied. The physical tests run on the composite sheets of Examples I and II were also run on the composite sheets of this example. The results are shown in Table II below.

TABLE I.—PHYSICAL TEST RESULTS

|  | One side coated | One side coated [1] | Two side coated | Two side coated [2] | Two side coated [3] |
|---|---|---|---|---|---|
| Heat seal range: | | | | | |
| 290° F., gms./2″ strip | 300–400 | 100–175 | 300–400 | 300–380 | 300–425 |
| 250° F., gms./2″ strip | 200–350 | 200–250 | 200–350 | 200–312 | 200–387 |
| 210° F., gms./2″ strip | 75–200 | 0–12 | 75–200 | 75–112 | 0–75 |
| Block | 1.5 | 2 | 1.5 | 2 | 2 |
| $O_2$ barrier—cc. $O_2$/100 sq. in., 24 hrs. at 1 atmosphere differential | 4–6 | 153 | .5 | 1.5 | 6.67 |

[1] Primer only, no Saran.
[2] Saran was 30% solids by weight.
[3] Saran only, no wax, no clay, coated onto primer.

TABLE II.—PHYSICAL TEST RESULTS

| | Concentration of wax and clay in Saran coating | | | | |
|---|---|---|---|---|---|
| | Wax ½%, clay ½% | Wax 1%, clay 1% | Wax 2%, clay 4% | Wax 4%, clay 2% | Wax 4%, clay 4% |
| Heat seal range: | | | | | |
| 290° F., gms./2″ strip | 200–275 | 300–475 | 350–362 | 200–262 | 300–450 |
| 250° F., gms./2″ strip | 200–350 | 200–425 | 150–187 | 100–200 | 200–275 |
| 210° F., gms./2″ strip | 10–50 | 300–387 | 12–32 | 0–173 | 0–75 |
| Block | 3 | 2.5 | 1 | 1 | 1 |
| $O_2$ barrier—cc. $O_2$/100 sq. in., 24 hrs. at 1 atmosphere differential | 3.3 | 5.6 | 2.2–2.4 | 1.4 | 8.3 |

What is claimed is:

1. A composite sheet comprising an oriented thermoplastic base sheet and a primer coating on at least one side thereof comprising a composition of:

from 50 to 80 parts by weight of a first component, said first component comprising an interpolymer of from 45 to 60 weight percent of $C_1$–$C_4$ alkyl methacrylate, from 50 to 35 weight percent of a $C_1$–$C_4$ alkyl acrylate, and from 1 to 5 weight percent of methacrylic, acrylic, or itaconic acid; and from 50 to 20 parts by weight of a second component, said second component comprising a compound selected from the group consisting of an adduct of rosin and an alpha-beta unsaturated dicarboxylic acid, said adduct having an acid number between about 115 and about 140 and a melting point between about 110° C. and about 180° C.; partial esters of said adduct and a polyhydric alcohol, and combinations of said adduct and said partial esters; the total parts by weight of said first component and said second component equalling 100; and a wax containing component selected from the group consisting of paraffin wax, microcrystalline hydrocarbon wax and a mixture of carnauba wax and stearic acid wherein the weight ratio of wax to acid is from 82:18 to 89:11, the wax containing component being present in an amount in the range of between about ½% and about 15% based upon the combined weight of the interpolymer combined with either the adduct, the partial esters or the combination of the adduct and the partial esters; and a second coating, applied to said primer coating, said second coating comprising a composition of 100 parts of a polymer selected from the group consisting of polyvinylidene chloride, copolymers of vinylidene chloride and acrylonitrile, and copolymers of vinylidene chloride and vinyl chloride, between about 2% and about 3% clay based on the solids weight of such polymer and between about 2% and 3% wax, based upon the solids weight of such polymer, the wax being selected from the group consisting of paraffin wax, carnauba wax and microcrystalline hydrocarbon wax.

2. The composite sheet of claim 1 wherein said wax of said second coating composition is paraffin wax.

3. The composite sheet of claim 1 wherein said wax of said second coating composition is microcrystalline hydrocarbon wax.

4. The composite sheet of claim 1 wherein said wax of said second coating composition is a mixture of carnauba wax and stearic acid wherein the weight ratio of wax to acid is from 82:18 to 89:11.

5. The composite sheet of claim 1 wherein said first component of said primer coating composition contains from about 1 to about 5 weight percent methacrylic acid.

6. The composite sheet of claim 1 wherein said first component of said primer coating composition contains from about 1 to about 5 weight percent of itaconic acid.

7. The composite sheet of claim 1 wherein said first component of said primer coating composition contains from about 1 to about 5 weight percent acrylic acid.

8. The composite sheet of claim 1 wherein said second coating composition is 35% solids by weight.

9. The composite sheet of claim 1 wherein said second coating comprises 100 parts of solid polymer, deposited from an aqueous solution, of vinylidene chloride copolymer, said vinylidene chloride copolymer comprising about 90% by weight of vinylidene chloride and about 10% by weight of acrylonitrile.

10. The composite sheet of claim 1 wherein said second coating comprises 100 parts of solid polymer, deposited from an aqueous solution, of vinylidene chloride copolymer, said copolymer comprising about 90% by weight of vinylidene chloride and about 10% by weight of vinyl chloride.

References Cited

UNITED STATES PATENTS

| 2,824,025 | 2/1958 | McIntyre | 117—76 F |
| 3,318,721 | 5/1967 | Lineburg | 117—76 F |
| 3,328,176 | 6/1967 | Sincock | 117—76 F |
| 3,375,130 | 3/1968 | Kincannon | 117—91 X |
| 3,345,196 | 10/1967 | Goldbeck | 117—76 F X |
| 3,459,582 | 8/1969 | Swerlick | 117—76 F X |
| 3,494,783 | 2/1970 | Kimura et al. | 117—92 X |

RALPH HUSACK, Primary Examiner

U.S. Cl. X.R.

117—91, 92, 122 H, 138.8 A, E, F